(12) United States Patent
Baughman

(10) Patent No.: US 6,408,399 B1
(45) Date of Patent: Jun. 18, 2002

(54) HIGH RELIABILITY MULTIPLE PROCESSING AND CONTROL SYSTEM UTILIZING SHARED COMPONENTS

(75) Inventor: Larry Douglas Baughman, Westerville, OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/256,908

(22) Filed: Feb. 24, 1999

(51) Int. Cl.[7] ................................................ G06F 11/00
(52) U.S. Cl. ................... 714/4; 714/7; 709/224
(58) Field of Search ...................... 714/4, 6, 7; 709/208, 709/209, 213, 220, 224

(56) References Cited

U.S. PATENT DOCUMENTS

| | | | | |
|---|---|---|---|---|
| 5,493,676 A | * | 2/1996 | Amundson | 714/42 |
| 5,544,347 A | * | 8/1996 | Yanai | 711/162 |
| 5,615,330 A | * | 3/1997 | Taylor | 714/7 |
| 5,675,723 A | * | 10/1997 | Ekrot | 714/4 |
| 5,781,716 A | * | 7/1998 | Hemphill | 714/4 |
| 5,812,751 A | * | 9/1998 | Ekrot | 714/4 |
| 5,852,724 A | * | 12/1998 | Glenn, II et al. | 709/239 |
| 6,038,681 A | * | 3/2000 | Saegusa | 714/6 |
| 6,141,707 A | * | 10/2000 | Halligan | 710/36 |
| 6,163,853 A | * | 12/2000 | Findlay | 714/4 |
| 6,219,799 B1 | * | 4/2001 | Kandasamy | 714/4 |
| 6,237,108 B1 | * | 5/2001 | Ogawa | 714/6 |
| 6,240,486 B1 | * | 5/2001 | Ofek | 711/112 |

* cited by examiner

*Primary Examiner*—Robert Beausoleil
*Assistant Examiner*—Bryce P. Bonzo

(57) ABSTRACT

The present invention provides a system of computers where one is active and processing data while the others standby. Data generated by the system is stored on at least two external, shared storage devices. The states of the computers are managed by a software system manager. This provides for a quick transition of a standby computer to an active computer when the system manager detects a need for a state change.

8 Claims, 5 Drawing Sheets

HIGH RELIABILITY MULTIPLE PROCESSING AND CONTROL SYSTEM UTILIZING SHARED COMPONENTS

FIELD OF THE INVENTION

This invention relates to computer systems, and more particularly to computer systems utilizing standby computers to provide back-up for an active computer.

BACKGROUND

Some computerized applications, such as those implementing a billing information system, require high operational reliability, because processing is ongoing and the input data is subject to frequent revision. For these applications, the availability of continuously functional hardware and the accurate backup of data is critical. To insure against data loss and protect against hardware failure, such applications are often implemented with a high-availability computer system. A high-availability computer system should function virtually all the time, or, at least, more often than normal computer hardware reliability factors typically allow.

To achieve the desired reliability, high-availability computer systems are known to use two computers running substantially in parallel (duplex systems). In a duplex system, one computer in the pair is active and performs the system's processing and data handling functions, including the modification of existing data and the addition of new data. The other computer, which replicates the processing capabilities of the active computer and has access to the same (or equivalent) data, is maintained in a standby mode, ready to assume the active state in the event of a problem with the active computer. To effectively implement a transition from standby to active, all data available to the standby computer must be current, reflecting all changes made by the active system.

An illustrative case of a known duplex system is shown in FIG. 1. Computers 1 and 2 are connected via a network 5. The internal disks 3 and 4 on each computer 1 and 2, respectively, store the data for the system. One method for maintaining synchronized data in such a duplex system is writing the data to storage devices 3 and 4 in each computer, 1 and 2 respectively, at each processing step, i.e., whenever data is accessed, transferred or modified. The data for the system shown in FIG. 1 may be stored in replicated directories which reside on the internal disks 3 and 4. Any modifications made to files in a replicated directory on the active computer are mirrored to the same directory on the standby computer.

For example, when computer 1 is active, and data is written to a file, it is actually written to two files, one on disk 3 and one on disk 4. Each file has the same name and, if the system is working correctly, the files are identical. Mirroring is accomplished by sending commands across the network 5 to which both computers 1 and 2 are connected.

This method of replication results in disadvantageously long transitions and unreliable data back-up. Transitions are time consuming because the data replication function ties state transitions to system management. To invoke a transition without compromising data replication, the system manager (a software entity) must notify each application in the system of a change in system states. This notification is typically done in a prescribed sequence, and the system manager waits for a reply before notifying the next application in the sequence. Before sending the reply, the application completes its processing steps, which involves writing and replicating data. Replication, in turn, requires transporting information across the network 5, which takes time and creates an opportunity for data loss during transmission. This results in lengthy state transitions (e.g. standby takeover of active's duties). Due to an application's need for frequent and immediate access to data, a long takeover time creates an unreasonable risk of data loss.

The typical duplex system, as shown in FIG. 1, also provides no data back-up when the system is running simplex. Each computer (1 or 2) stores data to its internal disk (3 or 4), respectively. When one of the computers 1 or 2 stops, either due to a manual command or a failure, the remaining computer writes data to its internal disk. It is a distinct disadvantage of known high-availability systems that, in the simplex mode, no data back-up exists.

SUMMARY OF THE INVENTION

In accordance with the principles of the present invention, there is provided a system for monitoring and maintaining multiple computers operating substantially in parallel, each of which can assume an active state, a standby state or a stopped state. In the active state, the applications (software) residing on the computer are running and ready to accept and process data. In the standby state, certain applications are running, however, data is not accepted or processed. A primary function of a computer in the standby state is to monitor the other computers in the system and itself, and to assume an active state when necessary. In a stopped state, the applications responsible for processing data are not running. This state may be the result of a manual request entered by the operator or of a system failure.

Data storage for the system is accomplished with shared, external storage devices. Each computer has equal access to the shared storage device arrangement; however, only one computer may write to it at a time. The external storage devices are configured to mirror each other; that is, the physical disks are linked together as a single logical disk by a disk manager. To the computers, these mirrored pairs appear as a single disk. The disk manager keeps mirrored pairs identical: all data updates go to both disks. In the event that one member of the pair fails, the active computer continues to operate with the disk manager making use of the remaining functional disk. When the failed disk is replaced, the disk manager brings the new disk up to date with its partner. In addition, any number of disks may be used to meet the storage needs of the system. In an exemplary embodiment, each additional disk has a backup, creating mirrored pairs.

The computer states are controlled by a software implemented system manager which determines when a system state transition should occur and then invokes the transition. The system manager resides on each computer in the system and any system manager may take action. A transition determination is based upon the state of the data processing applications on each computer, the data processing applications on the other computers in the system, and the states of the external storage devices. When a system is running duplex, a copy of the system manager runs on each computer. The copy running on the standby system monitors the data processing applications on its partner—the active system. If its partner becomes inactive, the system manager transitions the local (standby) system to active. The copy running on the active monitors the standby for a stopped state, in which case it issues a periodic alarm to warn the system administrator that the system is now running simplex (no backup).

In an exemplary embodiment, the system manager uses a software entity to query the states of applications running on its own (local) and other (remote) computers and the states of the external storage devices. The state information is returned to the system manager which takes action based upon predetermined state information criteria.

BRIEF DESCRIPTION OF THE DRAWINGS

A more complete understanding of the present invention may be obtained from consideration of the following description in conjunction with the drawings in which.

DETAILED DESCRIPTION

A high-availability computer system according to the principles of the present invention comprises multiple computers operating substantially in parallel, with one computer active and at least one computer standby. A method and apparatus are provided for transitioning the standby computer to an active state. By providing multiple, shared, external storage devices which appear as one disk to applications processing data (application processes) running on either computer and by separating state transition and data mirroring functionality, a system according to the principles of the present invention achieves a greater level of operational readiness than in the prior art.

For a better understanding of the invention, the first section hereof describes an exemplary system hardware architecture, along with the application processes which run on the system. The next section describes the functionality of a system according to the principles of the present invention. The functionality is implemented with a disk manager for ensuring data replication on the shared external devices, a system manager for monitoring application and hardware states and for causing a state transition, and an execution manager for grouping applications and for transitioning computer states. The final section describes exemplary decision criteria carried out by the system manager to control the system states.

Hardware Architecture

Figure 1:
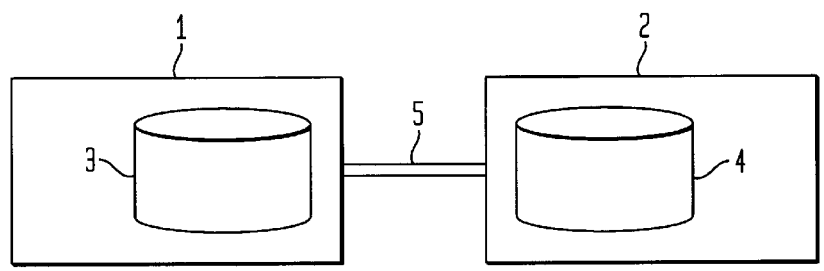
FIG. 1 depicts a prior art duplex system.
Figure 2:
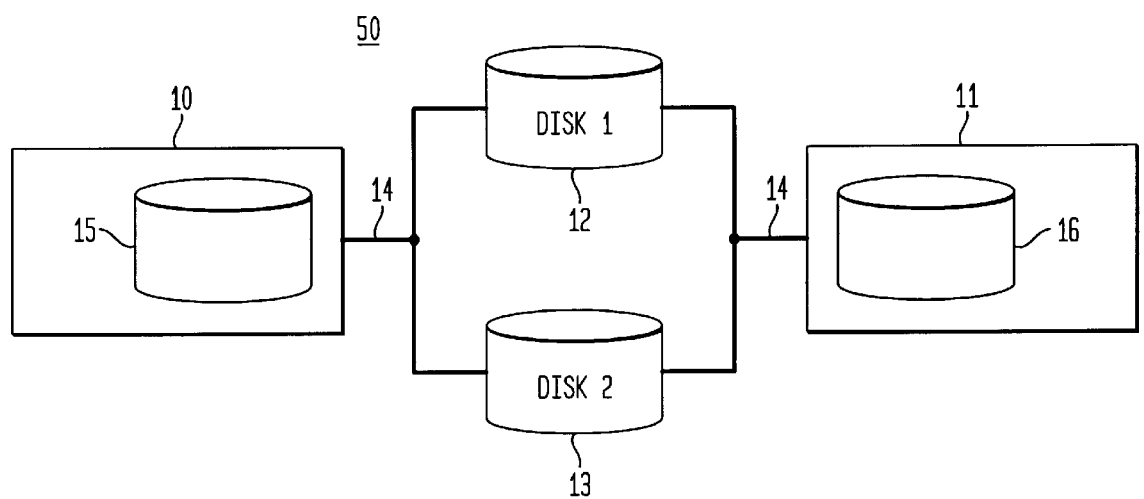
FIG. 2 depicts an exemplary system hardware architecture according to the principles of the present invention.

Referring now to FIG. 2 there is shown an exemplary hardware architecture 50 for carrying out the method of the invention in a duplex system. It should be noted that this is only an illustrative embodiment and the invention can be adapted to work with more than two computers and two shared disks. In an exemplary embodiment, computers 10 and 11 are desk top computers which may include a main processor system, a monitor and interactive input devices, such as a keyboard and a mouse. Each system typically includes a central processing unit (CPU), ROM and RAM memory, cache memory, a hard disk storage device, a floppy disk drive, graphics and audio cards, a network interface card, and a power supply, all interconnected using a conventional architecture. The computers 10 and 11 are operable to execute the method of the invention which may be stored as computer executable code in ROM, RAM, hard disk storage or any other type of memory which may be convenient.

Computers 10 and 11 are connected to external storage devices 12 and 13 via a suitable interface connection 14, such as a Small Computer System Interface (SCSI). Each computer 10 and 11 is configured to read from and write to each storage device 12 and 13; that is, each shared disk 12 and 13 is accessible to either computer when that computer is active. With this architecture, following a transition of a standby computer to active, the new active computer has access to all data that was processed and stored by the former active computer. Although the shared disk storage 12 and 13 is accessible by each computer 10 or 11, only one may write to the shared disks 12 and 13 at a time.

In an exemplary embodiment of the present invention, each computer 10 and 11 in the system of FIG. 2 runs UNIX® as its operating system, although the method of the invention may be implemented with other operating systems, such as Windows 95,® Windows 98® or Windows NT.® In a UNIX® based system, the external storage devices 12 and 13 are "mounted" to be accessed by either computer 10 or 11. Mounting a disk is a UNIX® defined process that enables a computer to read from and write to a disk. Mounting is fully explained in any UNIX Administrator's reference, such as *UNIX System V Release 4: System Administrator's Reference Manual,* Joyce V. Redal (Prentice Hall, 1990), which is incorporated herein by reference. The shared disks 12 and 13 are mounted for writing by the active computer, and the active application process has access to both disks 12 and 13.

For purposes of this description, application processes are the processes run by data processing software, as opposed to the procceses run by software responsible for system management. In the system of FIG. 2, such application processes may be stored locally on disks 15 and 16. These application processes read and write data to the shared storage devices 12 and 13, as will be described below. Application processes are started when the host computer is in an active state; that is, they run when they reside on the active computer. As a result, application processes do not have to be informed of computer states and can assume that the computer they reside on is in an active state. This eliminates the need for each application process to be notified of system states during a transition, which notification results in long transition times.

System Functions

Figure 3:
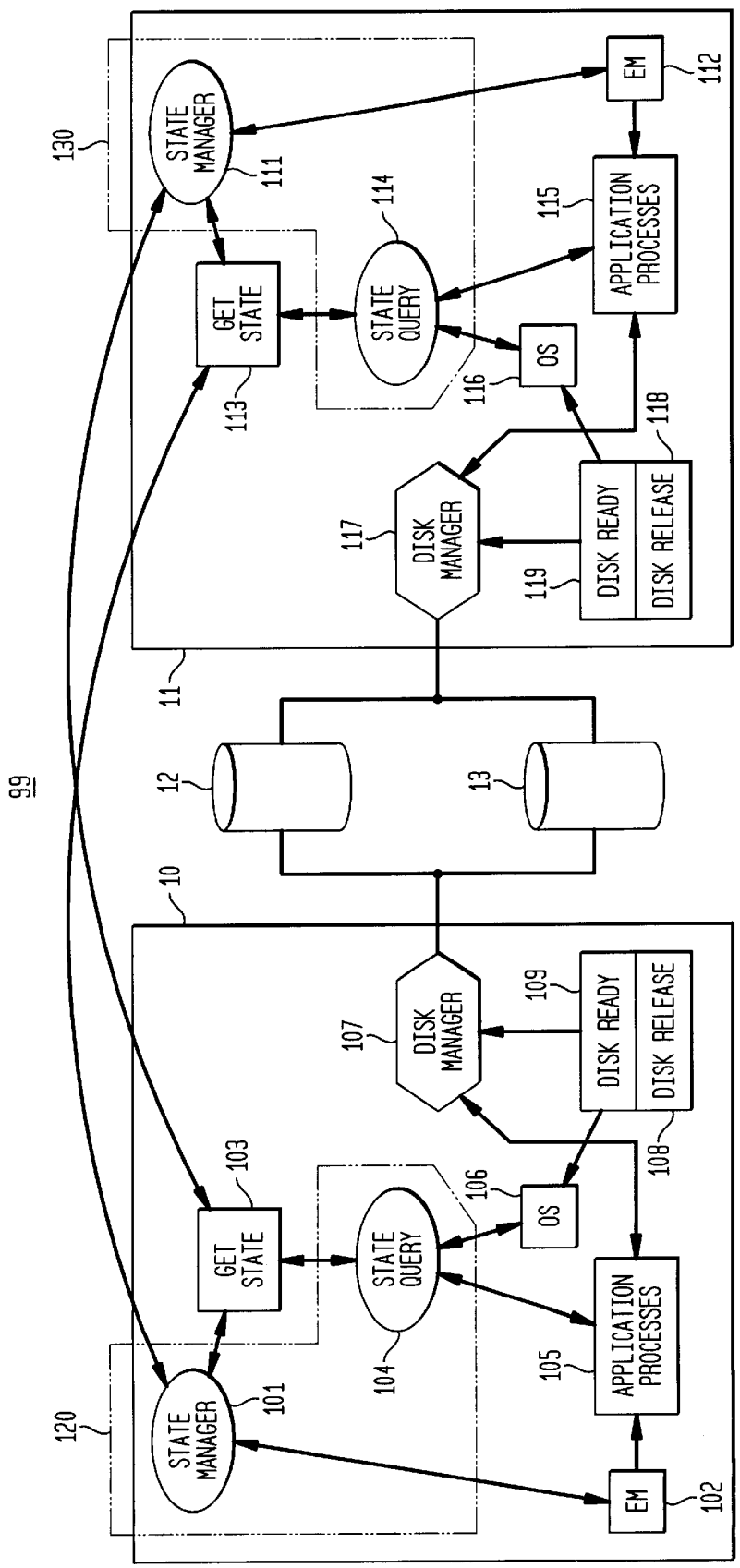
FIG. 3 depicts an exemplary functional diagram according to the principles of the present invention.

Referring now to FIG. 3, a functional diagram of a duplex system 99 according to the principles of the present invention is shown. The functionality represented by the blocks of FIG. 3 are carried out as computer implemented instructions operating in the hardware architecture of FIG. 2. Thus, where it is stated that a particular software entity functions to mirror data, what is meant is that the computers 10 or 11 of FIG. 2 executing the instructions comprising the software entity operates to mirror data to the external disks 12 and 13.

In the system 99 of FIG. 3, a disk manager 107 and 117 resides on each computer 10 and 11 to manage file manipulation on the shared disks 12 and 13. The disk manager 107 and 117 also causes the shared disks 12 and 13 to appear to the active computer as a single logical storage device. Thus, as the active computer writes or modifies data, the disk manager 107 and 117 replicates the data to both storage devices 12 and 13. The disk manager functionality is available in a number of commercial software packages, one of which is manufactured by Veritas Software Corporation (Veritas). A complete description of Veritas's disk management and data handling functionality can be found in the *Veritas Volume Manager—System Administrator's Guide* and in *Veritas File System—System Administrator's Guide,* which are sold with their respective software by Veritas Software Corporation, and which are incorporated herein by reference.

When the disk manager 107 and 117 is implemented with Veritas software, disk access is controlled utilizing importing and deporting disk groups. An imported disk group may be accessed for use by a computer, but a deported disk group may not. Importing and deporting disk groups is described in the above references.

Still referring to FIG. 3, a system manager 120 and 130 is also implemented in each computer 10 and 11 in the system 99. The system manager 120 and 130 insures that there is one computer in the active state at all times and invokes a transition of computer 10 or 11 to an active state if necessary. A secondary responsibility of the system manager 120 and 130 is to warn a system administrator via periodic alarms when the system is operating in simplex mode (one computer active with no standby available). The system manager 120 and 130 also checks for and corrects errors, such as both computers 10 and 11 assuming an active state, no computer 10 or 11 in an active state, the active computer unable to access the shared disks 12 and 13, and a non-active computer with access to the shared disks 12 and 13.

In an exemplary embodiment, each system manager 120 and 130 comprises a state manager and a state querier, as illustrated in FIG. 3. Since the system manager 120 and 130 resides on each computer 10 and 11, there are two state managers 101 and 111 and two state queriers 104 and 114. The state queriers 104 and 114 are configured to run at all times on both of the computers 10 and 11 in the duplex, even in the stopped state. The state managers 101 and 111 run in the active and standby states. The state managers 101 and 111 make decisions and carry out actions based upon state information obtained from state queriers 104 and 114.

State manager 101 obtains local state information form its local state querier 104 and remote state information from state querier 114 residing on the remote computer 11. On request, the state querier 104 determines the state of the application processes 105 on its local computer 10 (the computer it is running on) and of the shared disks 12 and 13, and reports the state information to state manager 101. The state information it reports is both application process 105 states and the state of the shared disk storage 12 and 13 relative to state manager's 101 host computer 10. The application process 105 state information may be active, standby or stopped, and disk state information may be accessible or nonaccessible (mounted or unmounted in a UNIX environment).

The state manager 101 and 111 may be implemented using a class library 103 and 113 (hereafter "GetState") which provides a library interface for sending state information requests to state queriers 104 and 114 and retrieving the replies. GetState 103 and 113 may be written in any object oriented language, such as C++, and it possesses sufficient functionality to ascertain the states of its host (local) computer and its partner (remote). There are two functions within the class: one to get the disk state of the shared disks 12 and 13; and one to get the state of the application processes 105 and 115 running on the computers 10 and 11. The functions will return a value indicating whether an application is active or standby or if a disk is accessible or inaccessible. If no value is returned for a predetermined time interval, GetState assumes that the application is stopped and the disk is inaccessible.

As shown in FIG. 3, execution managers (EMs) 102 and 112 are provided for managing the execution of application processes 105 and 115 and state managers 101 and 111 residing on the computers 10 and 11, respectively. EMs 102 and 112 group applications according to their function. Those that are responsible for data processing (application processes) are in one group and those that are responsible for state management are in another. EMs 102 and 112 have no control over the execution of the state queriers 104 and 114, because state queriers 104 and 114 run all the time, regardless of system states. Therefore, state queriers 104 and 114 are not grouped by the EMs 102 and 112.

EMs 102 and 112 have defined states that tie to the computer (10 and 11) states. When a computer 10 and 11 is in the stopped state, its EM (102 or 112) is Shutdown. When an EM (102 or 112) is Shutdown, none of the groups are running; however, state querier (104 or 114) continues to function. EM (102 or 112) assumes an Administrative state when its computer (10 or 11) is in the standby state. In an Administrative state, an EM (102 or 112) has the state management group (i.e. the system manager 120 and 130) running, but no application processes (105 or 115) running. EM (102 or 112) assumes a Running state when its host computer is active. When EM (102 or 112) is Running, application processes (105 or 115) are running and processing data and the system manager 120 and 130 is also running.

The state managers 110 and 111 communicate with the EMs 102 and 112 to cause state transitions. For example, in computer 10 the EM 102 is responsive to the state manager 101 for implementing state transitions. Application processes 105 are in turn linked to the just described EM states. To transition states, the state manager 101 simply commands the EM 102 to transition states and the application processes 105 respond accordingly. Advantageously, the state manager 101 never advises an application process 105 of state information or instructs an application process 105 to transition states.

When a transition occurs, the shared disks 12 and 13 are made available to the transitioning computer. Referring again to FIG. 3, Disk Ready 109 and 119 is provided in each computer 10 and 11 for making the shared disks 12 and 13 available when transitioning a computer to the active state. Similarly, when transitioning from the active state to the stopped state, Disk Release 108 and 118 causes the active system to forfeit access to the disks 12 and 13 so that they are available to the newly active computer. Disk Ready 109 and 119 makes the shared external disks 12 and 13 available to its local computer 10 or 11. When the disk manager 107 and 117 is implemented with Veritas software and the operating system 106 and 116 is UNIX®, Disk Ready 109 and 119 instructs the disk manager 107 and 117 to import the disks 12 and 13, and, once the disk is imported, the disk manager 107 and 117 instructs UNIX® 106 and 116 to mount the disk. When a computer 10 or 11 forfeits access to the shared disks 12 and 13, Disk Release 108 and 118 instructs UNIX® 106 and 116 to unmount the shared disks 12 and 13 and the disk manager 107 or 117 to deport the disks 12 and 13.

To invoke a transition of computer 10 from the active to the stopped state and of computer 11 from the standby to active state, for instance, as the result of a user command entered into computer 10, EM 102 residing on computer 10 first stops the application processes 105 on computer 10 by transitioning to an Administrative state. Next, the shared disks 12 and 13 are released by computer 10 using Disk Release 108 as discussed above. Then, EM 102 stops the processes of the state manager 101 putting EM 102 on computer 10 in the Shutdown state. The state manager 111 on computer 11 next detects that computer 10 is stopped and uses Disk Ready 119 to make the shared disks 12 and 13 accessible to the application processes 115 on computer 11. Then, state manager 111 issues commands to its EM 112 to start the application processes 115 so that computer 111 is active.

Figure 4A:
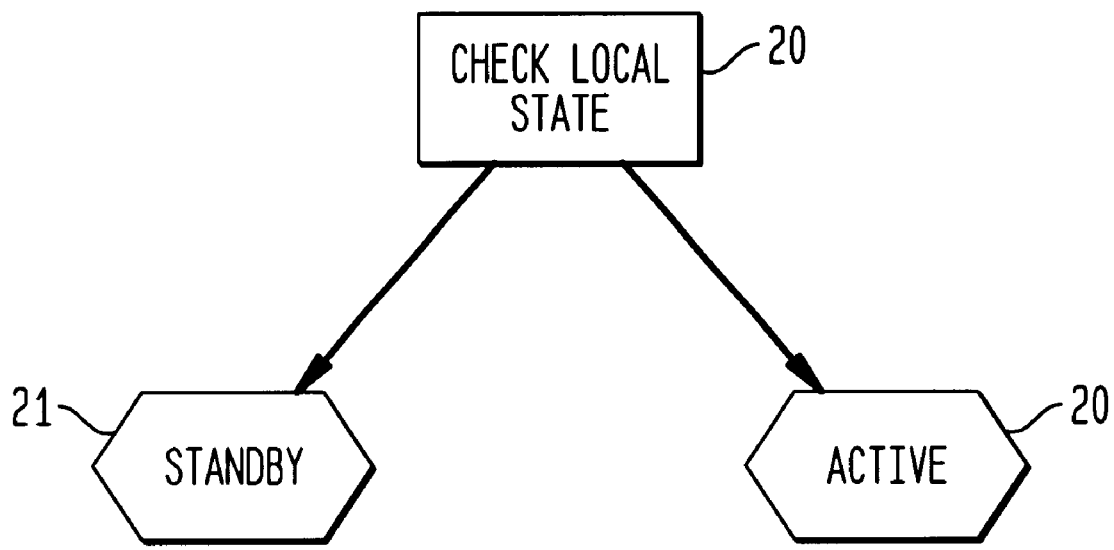
FIGS. 4A, 4B and 4C are decision tree diagrams for an exemplary system management function according to the principles of the present invention.
Figure 4B:
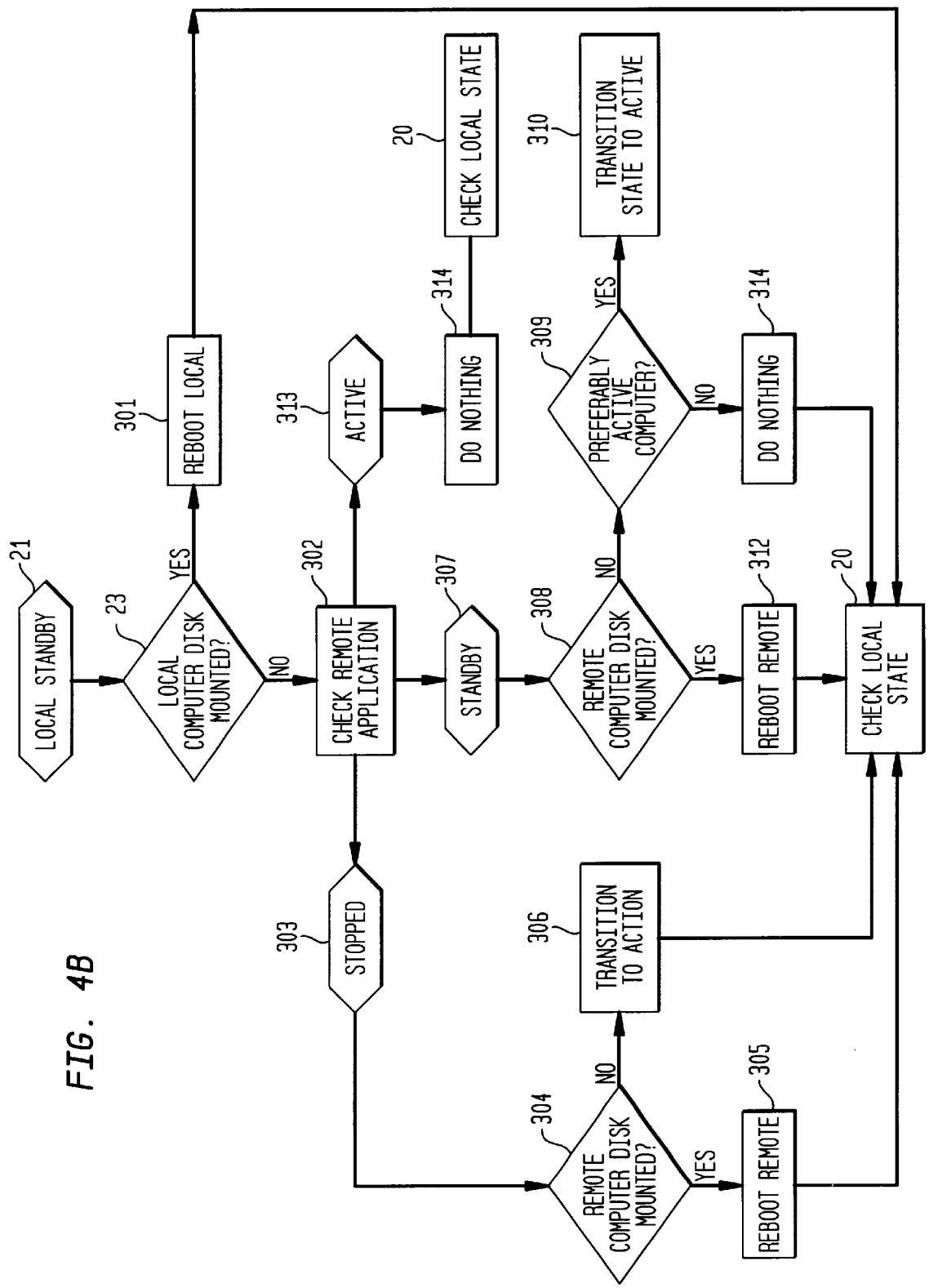
Figure 4C:
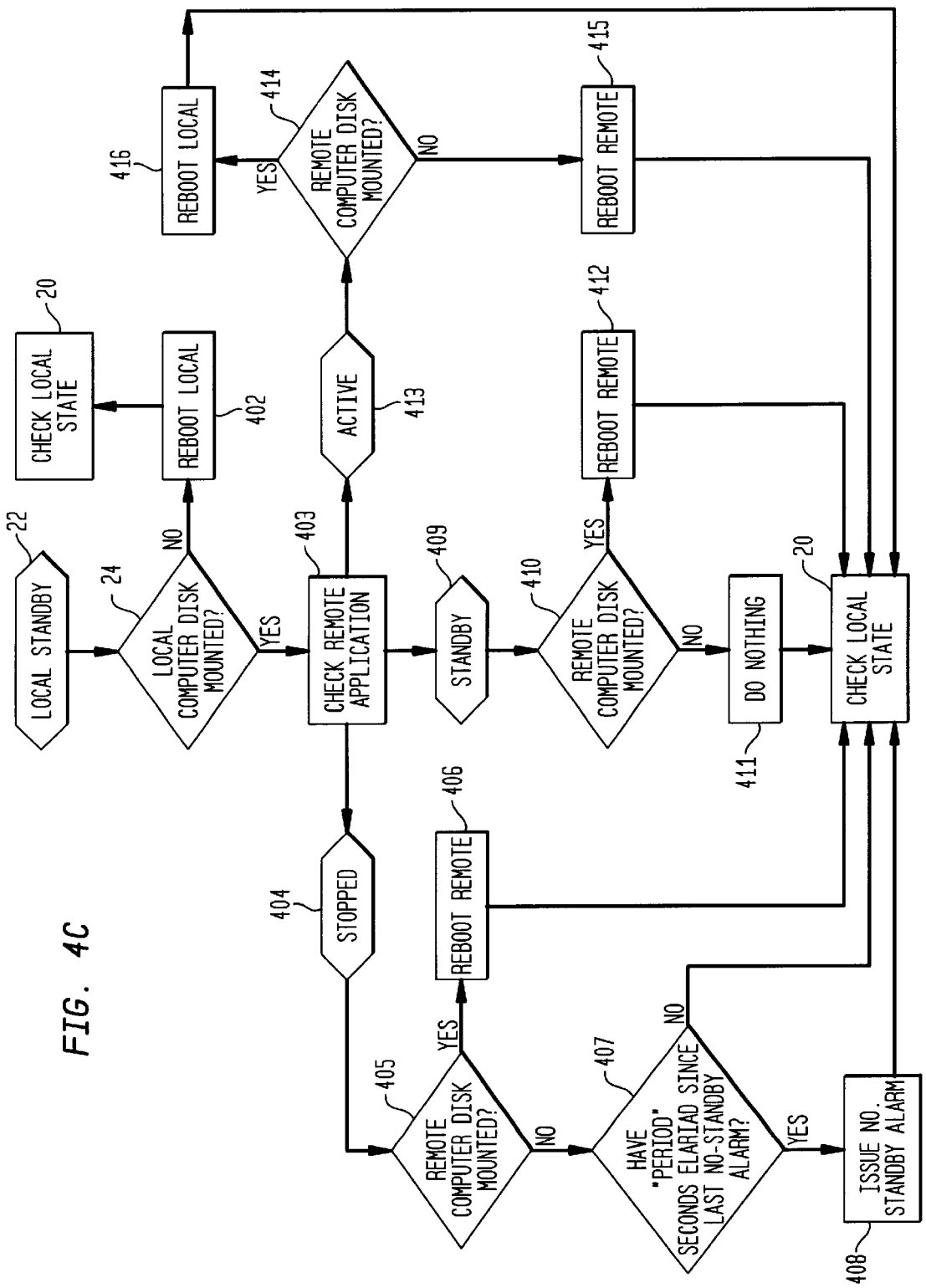

Referring now to FIGS. 4A, 4B and 4C as well as FIG. 2 and FIG. 3 there are shown exemplary decision trees implemented by a state manager to determine which computer 10 or 11 of FIG. 2 should be active. By implementing these decision trees, one computer is maintained in the active state and only the active computer writes to the shared storage devices 12 and 13. When a querying computer determines that it is not active and it does not expect its partner to be active, the querying computer will transition itself to active. When a querying computer determines that an error exists, such as more than one computer is active or a standby computer has mounted the shared disks, the querying computer will take corrective action by re-booting the computer responsible for the error.

The high-level operation of a state manager 101 is shown with reference to FIG. 4A. For purposes of this discussion, computer 10 is local; that is, the decision trees describe state manager 101 running on computer 10. State manager 101 first checks the state of the computer on which it resides, as indicated in process box 20. If the local computer 10 is in a standby state, as shown in state circle 21, state manager 101 will follow the decision tree shown in FIG. 4B. Otherwise, if the local computer 10 is in an active state, as indicated in state circle 22, state manager 101 implements the decision tree shown in FIG. 4C. State manager 101 does not monitor its local computer 10 for the stopped state.

Referring to FIG. 4B, there is shown the decision tree followed by state manager 101 when its host computer (local computer 10) is in a standby state, as indicated by state circle 21. State manager 101 checks the state of the shared disks 12 and 13 to see if they are mounted by the local computer 10, as indicated by decision block 23. If the disks 12 and 13 are mounted by the local computer 10 (indicating an error), the local computer 10 is rebooted according to predetermined instructions (shut down and started again) to correct the error, as indicated by process block 301, and state manager 101 returns to process block 20. When the shared disks 12 and 13 are not mounted by the local computer 10, state manager 101 checks the state of an application process 115 running on remote computer 11, as shown at 302. If the remote application process 115 is active, as shown in state circle 313, the system 99 is properly running duplex and the local computer 10 does nothing, at 314. State manager 101 then returns to process block 20.

If the remote application process 115 is stopped (the local computer 12 is still standby), as in state circle 303, state manager 101 checks the status of the shared disks 12 and 13 in decision block 304. If the shared disks 12 and 13 are mounted by the remote computer 11, the remote computer 11 is rebooted as indicated by process block 305 and state manager 101 returns to process block 20. This reboot corrects the erroneous mounting of the external shared disks 12 and 13 by the stopped computer 11. This also insures agreement between the remote application process 115 state and the state of the external shared disks 12 and 13. If the remote computer 11 is stopped and the shared disks 12 and 13 are not mounted by the remote computer 11, the local computer 10 will transition to an active state, as at 306, before returning to process block 20.

Still referring to FIG. 4B, if the remote computer 11 is standby (i.e., both computers 10 and 11 are standby), as shown in state circle 307, the status of the shared disks 12 and 13 are checked in decision block 308. If the shared disks 12 and 13 are mounted by the remote computer 11, the remote computer 11 is rebooted 312, since a standby computer should not mount to the shared disks 12 and 13. State manager 101 then returns to process block 20.

If the shared disks 12 and 13 are not mounted by the remote computer 11, state manager 101 queries whether the computer on which it resides is preferably active, in this case local computer 10, as indicated in decision block 309. The preference is a design choice. If so, state manager 101 starts the application processes 105 (via the EM 102) on the local computer 10, making the local computer 10 active, as at 310. Once the transition occurs, the decision process starts over again at process block 20. If the local computer 10 is not preferably active, no transition takes place, at 314, and the state manager 101 again checks the local state, at 20.

Referring now to FIG. 4C, there is shown the decision tree followed by state manager 101 when the local computer 10 is active, as indicated by state circle 22. State manager 101 first checks to see if the shared disks 12 and 13 are mounted by the local computer 10, as shown in decision block 24. If they are not mounted by the local computer 10, the local computer 10 is rebooted, as indicated in process block 402, and state manager 101 returns to process block 20. This reboot causes the local computer 10 (active) to mount the shared disks 12 and 13. If the shared disks 12 and 13 are mounted by the local computer 10, the remote computer 11 is checked for its state at 403.

If the remote computer 11 is stopped (indicating that there is no standby) as at 404, the status of the shared disks 12 and 13 are checked 405. If the shared disks 12 and 13 are mounted by the stopped remote computer 11, the remote computer 11 is rebooted to correct the error, at 406, and state manager 101 starts over at process block 20. Otherwise, if the shared disks 12 and 13 are not mounted by the stopped remote computer 11, state manager 101 determines whether a pre-determined amount of time has passed since a NO_STANDBY alarm has been issued, as indicated in decision block 407. The NO_STANDBY alarm alerts that there is no standby computer to provide backup because the remote 11 is stopped. If the pre-determined amount of time has passed without an alarm issuing, state manager 101 causes an alarm to issue, as at process block 408. State manager 101 then returns to process block 20. If the pre-determined amount of time has not passed, state manager 101 will start the decision tree over again, at 20.

If the remote computer 11 is in standby (computer 10 is still active), as in state circle 409, state manager 101 checks the status of the shared disks 12 and 13, as indicated in process block 410. If the shared disks 12 and 13 are mounted by the remote computer 11, an error condition exists and the remote computer 11 is rebooted as in process block 412. If the shared disks 12 and 13 are not mounted by the remote computer 11, then there is no error state and state manager 101 does nothing 411. Process control then returns to process block 20.

If the remote computer 11 is in an active state, as indicated by state circle 413, an error condition exists because both computers 10 and 11 are active. The local computer's 10 state manager 101 checks the state of the shared disks 12 and 13 in decision block 414. If the shared disks 12 and 13 are mounted by the remote computer 11, the local computer 10 is rebooted 416. The local computer 10 should reboot to a standby state to correct the error condition, and its state manager 101 returns to process block 20. If the shared disks 12 and 13 are not mounted by the remote computer 11, then the remote computer 11 is rebooted, in process block 415 before state manager 101 returns to process block 20. Similarly, this reboot causes the remote computer 11 to assume the standby state, since the local computer 10 is active and has properly mounted the shared disks 12 and 13.

CONCLUSION

The invention provides a system and method for operating a standby computer. Each computer in the system is connected to shared, external storage devices. These devices appear as a single device to the active computer, facilitating the replication of data to each device. Each computer runs a system manager operable to ascertain the state of application processes running on the system manager's host computer, the other computers in the system, and the external storage devices. According to predetermined state information criteria, a standby computer transitions to active at which time it reads and writes to the external devices. The system manager also determines if certain error conditions exist and instructs the erroneous computer to reboot to correct the error condition.

It is to be understood that the invention is not limited to the illustrated and described forms of the invention contained herein. It will be apparent to those skilled in the art that various changes may be made without departing from the scope of the invention and the invention is not considered limited to what is shown in the drawings and described in the specification.

What is claimed is:

1. A computerized data management system, comprising:
   a plurality of computers having application processes residing on each of said computers, wherein at least one computer is in an active state and at least one computer is in a standby state;
   at least one pair of shared, external storage devices operable to record data from at least one of said computers; and,
   at least one system manager running on at least one of said computers, wherein said system manager further comprises a state querier for querying said state of said application processes and of at least one of said external storage devices, and said system manager causes a transition of at least one of said computers according to a predetermined decision criteria.

2. The system of claim 1 wherein at least one computer of said plurality of computers is capable of entering a stopped state, said system manager is operable to query said plurality of computers to identify if a computer has entered said stopped state, and send an alarm message when at least one of said plurality of computers are in said stopped state for a predetermined time.

3. A computerized data management system, comprising:
   a plurality of computers having application processes residing on each of said computers, wherein at least one computer is in an active state and at least one computer is in a standby state;
   at least one pair of shared, external storage devices operable to record data from at least one of said computers; and,
   a system manager residing on each of said plurality of computers, wherein said system manager residing on said standby computer is operable to query a state of said application processes on said active computers and at least one of said external storage devices.

4. A method for managing a computer system having at least a first computer and a second computer, at least one pair of shared external storage devices, and at least one application process residing on the first computer and on the second computer, comprising the steps of:
   querying at least one application process and at least one shared external storage device for state information, wherein said state information is selected from the group comprising:
   active state;
   a standby state;
   a stopped state;
   an accessible shared external storage device; and
   an inaccessible external storage device;
   rebooting one of said computers when said state information for that one said computer indicates an error condition, wherein the causation of said error condition comprises the external shared storage devices becoming accessible to one of the computers in said standby state; and,
   transitioning one of the said computers to an active state when said state information indicates that neither of the computers is in said active state.

5. A method for managing a computer system having at least a first computer and a second computer, at least one pair of shared external storage devices, and at least one application process residing on the first computer and on the second computer, comprising as the steps of:
   querying at least one application process and at least one shared external storage device for state information, wherein said state information is selected from the group comprising:
   an active state;
   a standby state;
   a stopped state;
   an accessible shared external storage device; and
   an inaccessible external storage device;
   rebooting one of said computers when said state information for that one said computer indicates an error condition, wherein the causation of said error condition comprises the external shared storage devices becoming accessible to one of the computers in said stopped state; and,
   transitioning one of the said computers to an active state when said state information indicates that neither of the computers is in said active state.

6. A method for managing a computer system having at least a first computer and a second computer, at least one pair of shared external storage devices, and at least one application process residing on the first computer and on the second computer, comprising the steps of:
   querying at least one application process and at least one shared external storage device for state information, wherein said state information is selected from the group comprising:
   an active state;
   a standby state;
   a stopped state;
   an accessible shared external storage device; and
   an inaccessible external storage device;
   rebooting one of said computers when said state information for that one said computer indicates an error condition, wherein the causation of said error condition comprises the external shared storage devices becoming inaccessible to one of the computers in said active state; and,
   transitioning one of the said computers to an active state when said state information indicates that neither of the computers is in said active state.

7. A method for managing a computer system having at least a first computer and a second computer, at least one pair of shared external storage devices, and at least one application process residing on the first computer and on the second computer, comprising the steps of:

querying at least one application process and at least one shared external storage device for state information;

rebooting one of said computers when said state information for that one said computer indicates an error condition;

transitioning one of the said computers to an active state when said state information indicates that neither of the computers are in said active state; and, issuing an alarm when said state information indicates that neither of the computers are in a standby state and further issuing said alarm when a predetermined amount of time has elapsed since a prior issuance of said alarm.

8. A method for managing a computer system having at least a first computer and a second computer, at least one pair of shared external storage devices, and at least one application on the first computer and on the second computer, the method comprising the steps of:

querying at least one application on the second computer and at least one shared external storage device for state information;

querying at least one application on the first computer and at least one shared external storage device for state information;

rebooting one of said computers when said state information indicates an error condition; and, transitioning the first computer to an active state when said state information indicates that the first computer and the second computer are in a standby state and the external storage devices are inaccessible to the first computer and the second computer.

* * * * *